March 1, 1932.                D. KUSKIN ET AL                1,847,091
                              WINDSHIELD WIPER
                           Filed July 11, 1928        2 Sheets-Sheet 1

INVENTOR
David Kuskin
Charles Kuskin
BY
Franklin J. Foster
ATTORNEY

March 1, 1932.    D. KUSKIN ET AL    1,847,091
WINDSHIELD WIPER
Filed July 11, 1928    2 Sheets-Sheet 2
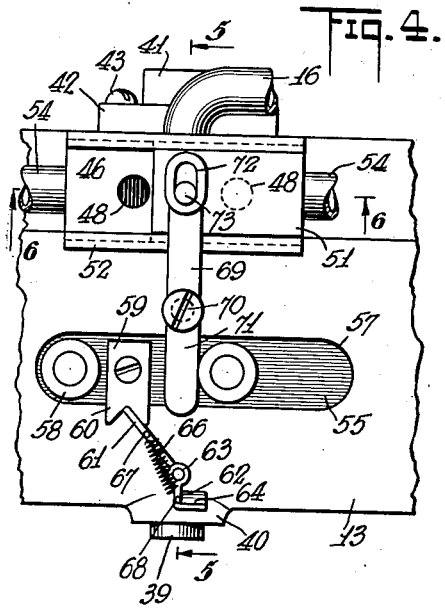
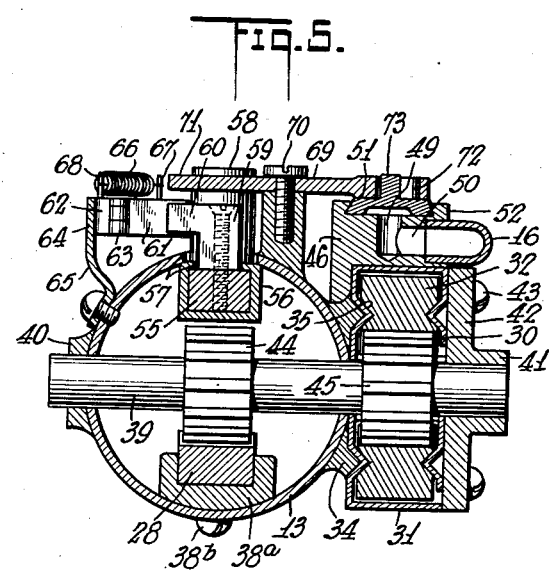
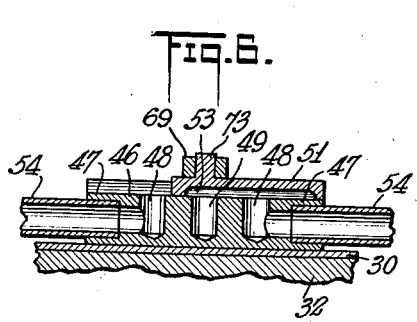
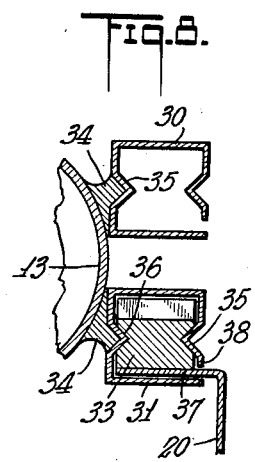
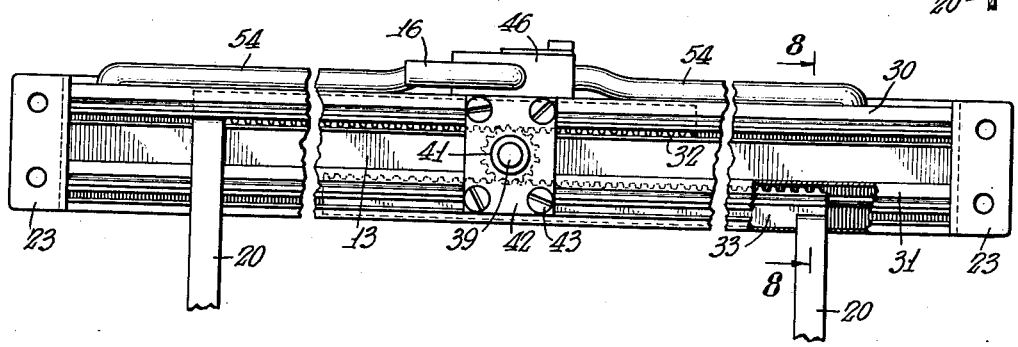
INVENTOR
David Kuskin
Charles Kuskin
BY
Franklin J. Foster
ATTORNEY Patented Mar. 1, 1932

1,847,091

UNITED STATES PATENT OFFICE

DAVID KUSKIN AND CHARLES KUSKIN, OF NEW YORK, N. Y.; SAID CHARLES KUSKIN ASSIGNOR TO SAID DAVID KUSKIN

WINDSHIELD WIPER

Application filed July 11, 1928. Serial No. 291,715.

The present invention is concerned with the provision of a wiper mechanism which may have a wide range of utility, but which finds its preferred embodiment in a unitary assembly of wiper means and driving means adapted to be removably mounted in operative relationship to the ordinary automobile windshield.

The present trend in windshield wiper development is to provide means which will wipe the entire surface of the windshield rather than merely a small space directly in front of the driver. Several types of wiper mechanism have thus far been designed to effect this complete wiping action. In one type a single wiper travels back and forth across the entire windshield surface. Inasmuch as the speed at which the wiper may operate is necessarily slow, such a wiper is very inefficient in that a previously wiped window surface may become bespattered with rain before the wiper again reaches it.

Another mechanism designed to effect full windshield wiping is a double wiper arrangement in which two wipers are reciprocated and each wiper takes care of approximately half of the windshield surface. The two wipers always travel in the same relative direction with the result that when the wiper is not in use one of the wiper elements or both of them will always be conspicuously positioned at or near the center of the windshield with consequent interference with a full view of the road.

An object, therefore, of the present invention is to provide a windshield wiper which combines the advantages of both types of mechanism discussed above and eliminates their disadvantages, or in other words to provide a windshield wiper which combines the speed of the double wiper arrangement with the inconspicuousness of the single wiper arrangement.

Such a result is preferably accomplished by the provision of two wipers which are simultaneously reciprocated in relatively opposite directions rather than in the same direction, the wipers moving from the outer edges of the windshield to the center where they meet and then returning to such outer edges. Thus each wiper takes care of half of the windshield surface. The wiping action is rapid. The wipers when not in use are disposed at opposite sides of the windshield adjacent the windshield frame so that they in no manner interfere with the driver's view.

Another object is to provide a windshield wiper operating mechanism of general utility, but which is peculiarly and primarily adapted for the positive and efficient actuation of a pair of oppositely reciprocating wiper elements of the character just discussed.

Other and more general objects are to provide a windshield wiper and an operating gear therefor which will be simple and practical in construction, rugged and durable in use, positive and efficient in operation, and well suited to the requirements of economical manufacture and convenient installation on standard types of motor vehicles.

With the above noted and other objects in view, the invention consists in certain novel feautres of construction and combinations and arrangements of parts as will be more fully hereinafter described and pointed out in the claims.

The invention may be more fully understood from the following description in connection with the accompanying drawings, wherein:

Fig. 4 is an enlarged top plan detail of the valve and its operating mechanism, this view showing the valve in the opposite position from that of Figure 2.

Fig. 5 is a transverse sectional view on the line 5—5 of Fig. 4.

Fig. 6 is a longitudinal sectional detail on the line 6—6 of Fig. 4.

Fig. 7 is a broken side elevational view of the windshield wiper showing the side which normally lies against the face or frame of the windshield.

Fig. 8 is an enlarged transverse sectional view on the line 8—8 of Fig. 7.

Figure 1:
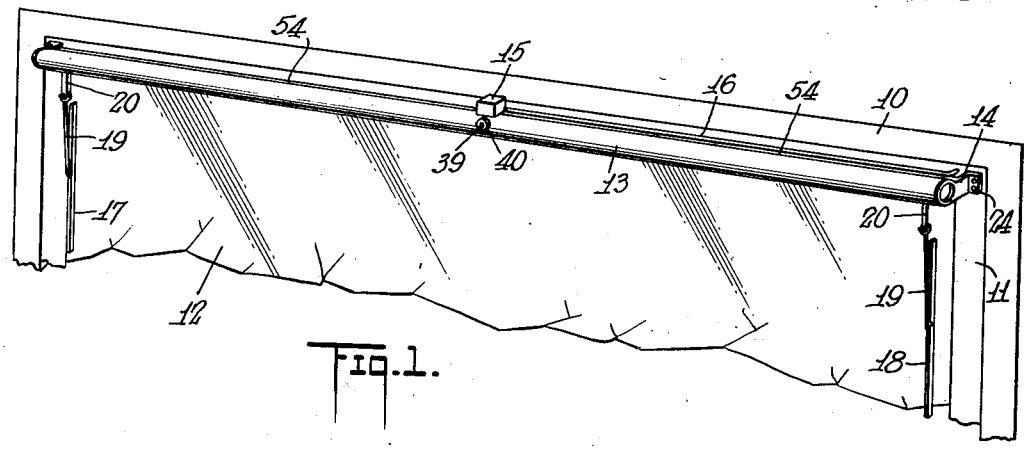
Fig. 1 is a somewhat diagrammatic fragmentary perspective view of the outside of a windshield showing my improved wiper mounted therein.

In Figure 1 we have used the reference numeral 10 to designate the frame at the forward end of a motor vehicle within which the frame 11 for the usual windshield 12 is mounted. The device of the present invention includes a relatively small diameter cylinder tube 13 preferably extending the full width of the windshield and secured at its ends to brackets 14, the latter being attached to the upper corners of the windshield frame 11. A housing 15 is secured upon the central portion of the tube 13 and accommodates the valve gear and various other mechanism to be later described. A pipe line 16, preferably from the intake manifold of the engine, leads into the housing. A pair of wiper elements 17 and 18 are driven in a manner to be later described from driving mechanism associated with or housed within the tube 13, these wipers being supported by spring tensioning arms 19 from depending brackets 20 connected with the operating mechanism.

In use the wipers 17 and 18 move from the extreme positions illustrated in Figure 1 toward the center of the windshield where they meet or nearly meet and then return to the outer edges of the windshield. The wipers thus reciprocate always in relative opposite directions to rapidly clean substantially the full surface of the windshield, and when not in use occupy the position of Figure 1, in which they are entirely clear of the driver's line of vision and do not interfere with the view of any occupant of the car.

Before describing the mechanism which is utilized for imparting the desired movement to the wiper elements, it may be noted that such mechanism in itself is capable of a wide range of utility, and may be conveniently used for operating various types of wipers either singly or in pairs, and for imparting other movements thereto than the particular motion herein described.

Figure 2:
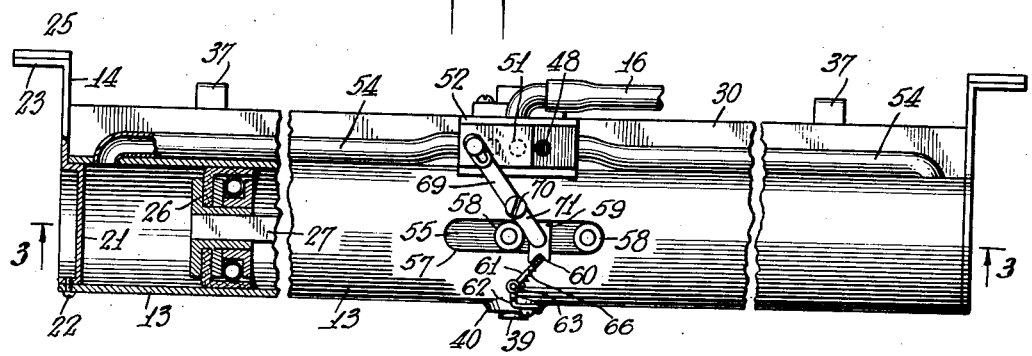
Fig. 2 is a broken top plan view of the wiper with certain parts in section for clearness.

As best seen in Figure 2, the open ends of the tube 13 are closed by dished sections 21 of the brackets 14, the connection between sections 21 and tubes 13 being preferably strengthened by screw 22. Brackets 14 are provided at their inner ends with laterally turned apertured extensions 23 for the reception of securing screws 24 and such extensions are preferably backed with felt or other material 25 to prevent scratching of the windshield frame.

Reciprocable in the tube 13 are a pair of rigidly connected pistons 26 which may be of conventional construction. These pistons are spaced apart a distance approximately equal to half the length of the tube 13 and are connected together by a rigid piston rod 27, the intermediate portion of which is preferably offset as at 28 and provided with rack teeth 29 facing toward the longitudinal axis of the cylinder.

The offset intermediate portion 28 of piston rod 27 is retained against bending and the pistons and rod held against rotation in the tube by a guide member 38a secured in position within the bottom of the tube 13 by screws 38b and cradling, backing and guiding piston rod section 38.

Secured one above the other in spaced relationship at the inner side of the tube 13 and extending the full length of the tube are hollow guide members 30, 31, which members slidably receive racks 32 and 33 of approximately half the length of the guides and tube.

Guides 30 are secured to the tube in any suitable manner, as by casting them integral therewith or by welding or brazing them to longitudinal rails 34 secured to the tube. Each guide member is of generally rectangular cross-sectional shape and provided at opposite sides with inwardly extending V-shaped rails 35 which enter similarly shaped grooves 36 in the racks and overcome any tendency of the racks to tilt or turn about their longitudinal axes.

The wiper carrying bracket members 20 include offset upper ends 37 extending through slots 38 in the guides 30, 31 and secured in any suitable manner to the racks 32, 33.

A short shaft 39 disposed in horizontal position extends transversely through the center of the tube 13. This shaft has a bearing at 40 in the outer side of the tube and a bearing at 41 in a plate 42 secured upon the outer faces of the guide members 30, 31 as by screws 43. The plate 42 sustains the intermediate portions of the relatively long guideways against independent movement and the ends of the guides are fixed in any suitable manner to the brackets 14 whereby bodily movement of the guides relatively to the tube is prevented and the guides are sustained against vibration.

A pinion 44 fixed to the shaft 39 within the cylinder 13 meshes with the rack 29 and a pinion 45 fixed to the shaft 39 exteriorly of the tube is in mesh with both the upper rack 32 and the lower rack 33. Thus movement of the rack 29 in one direction acts through the shaft 39 and pinions 44 and 45 to impart motion to the racks 32 and 33 and consequently the wipers 17 and 18. The racks 32 and 33 are driven in opposite directions as will be readily understood and as the pistons 26 and their connecting rod are reciprocated in the tube 13, racks 32, 33 and wipers 17, 18 will be simultaneously reciprocated to effect cleaning of the windshield.

Preferably the piston unit, consisting of pistons 26, 26 and rod 27 is reciprocated by differential air pressures in opposite ends of the cylinder, such differential pressure being produced by alternately placing opposite ends of the cylinder in connection with the atmosphere and the engine intake manifold respectively.

The supply and exhaust of air is controlled through a block 46 preferably mounted upon the top of the upper guide 30. This block is provided with horizontal bores 47 in its ends communicating with vertical bores 48 opening through the top of the block. Between the bores 48 is a third vertical bore 49 communicating with a horizontal bore 50 drilled laterally into the block. A slide plate 51 is mounted to travel between undercut rails 52 on the top of the block. The under face of the plate 51 is dished as at 53, so that when the plate covers the central bore 49 and either of the end bores 48, such end bore and the central bore communicate with each other through the cavity in the bottom of the plate. Pipes 54 communicating with the cylinder adjacent opposite ends of the latter are connected to the respective bores 47 and the pipe 16 leading to the engine intake manifold is connected to the bore 50.

With the valve plate 51 in the position of Figure 2, the right hand port 48 is uncovered and the right hand end of the cylinder is open to atmospheric air pressure. The left-hand port 48, however, is in communication with the central port 49 through the cavity 53 and air is being exhausted from the left hand end of the cylinder, thus causing a differential pressure in opposite ends of the cylinder, which will tend to draw the pistons to the left in Figure 2 and will move the lower rack bar 33 to the left and the upper rack bar 32 to the right. In Figure 4 the position of the valve plate has been reversed, air is entering the left hand end of the cylinder and being exhausted from the right hand end and the direction of travel of the pistons and rack bars is reversed.

Novel means is provided for effecting the rapid shifting of the valve plate from one extreme position to the other so that there will be no retardation of piston operation by placing both ends of the cylinder in communication with the source of suction at the same time or by a delay in placing one end of the cylinder in communication with the source of suction after it has been cut off from its supply of air at atmospheric pressure.

The means which is used for quickly snapping the valve plate back and forth includes a block 55 slidable longitudinally in a guide sleeve 56 secured interiorly of the cylinder 13 immediately above the pinion 44. Fixed upon the top of the block 55 and working through alined slots 57 in the sleeve 56 and tube 13 are a spaced pair of studs or rollers 58. Mounted between said studs and also secured to the block 55 is a post 59 provided at its upper end with a laterally forked extension 60 adapted to straddle one leaf 61 of a two-plate hinge. The second leaf is shown at 62 and the hinge knuckle at 63. Preferably the leaf 62 is provided with a tailpiece 64 rigidly fixed to a bracket 65 mounted on the tube 13. A coiled contractile spring 66 is anchored at its ends to pins 67 and 68 projecting upwardly from the respective hinge leaves. This spring serves as a past center actuating member to smartly swing the spring 66 in one direction or another, after the leaf has been moved beyond a dead center position by its actuating fork 60.

Figure 3:
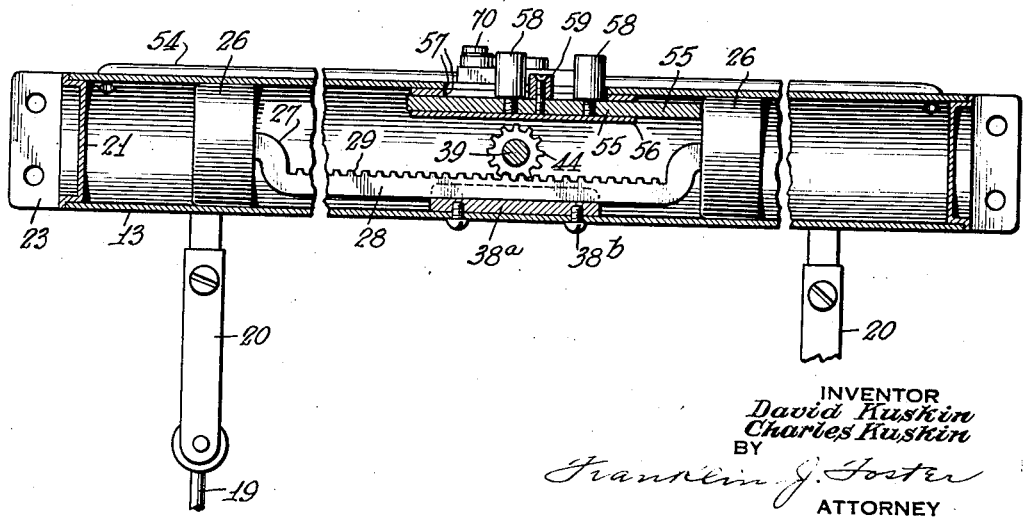
Fig. 3 is a longitudinal sectional view taken approximately on the line 3—3 of Figure 2.

As best seen in Figure 3, block 55 is disposed in the path of travel of the pistons 26, so that each piston, as it nears the ends of its stroke, will engage the block 55 and tend to slide it in its sleeve. A lever 69 pivoted intermediate its ends as at 70 on the top of the tube 10, includes one end 71 mounted between the studs 58 and in the path of travel of the latter, and a slotted end 72 engaged with a stud 73 on the top of the valve plate 51.

In operation, as the pistons approach the limit of their travel to the left, as seen in Figure 3, the right hand piston engages the right hand end of the block 55 and moves this block toward the left. In Figures 2 and 3 the parts are shown in a position where the piston has just picked up the plate. As this plate is moved along by the piston, the fork 60, travelling with it, moves the hinge leaf 61 from the position of Figure 1 to and beyond a dead center position, at which time spring 66 throws the leaf 61 smartly to the left, and thereby snaps the block 55 to its extreme left hand position, causing the right hand stud 58 to engage the end 71 of the lever 69, rapidly swinging this lever from one extreme position to the other and shifting the valve plate 51 to the right. Obviously the action of the spring 66 moves the block 55 much more rapidly than the speed at which the piston 26 is traveling. Before the piston again catches up with the block, the valve 51 will have acted to reverse pressure conditions in opposite ends of the cylinder and the direction of travel of the pistons will have been reversed. As the pistons move toward the right a reverse operation occurs by which the lever 69 and valve plate 51 are shifted back to the position of Figure 2 by the past center spring 66.

It is believed that the operation of the mechanism having been made clear from the foregoing description, a further description would be merely repetitious.

It may be noted that special instrumentalities herein illustrated and described for imparting the desired unique movement to the windshield wipers are also capable, within the spirit of the invention, of operating other types of wipers in various manners.

It will also be understood that the present invention in its broader aspects contemplates the utilization of any type of operating gear for imparting the desired movement to the wiper elements.

The housing 15 for the valve gear and associated parts has been omitted in other figures of the drawings for the sake of clarity.

In assembling the various mechanisms within the cylinder a slot may be made at the center of the cylinder to facilitate assembly. This slot may be later closed for dust excluding purposes but if left open can do no harm since the pressure existing in the space between pistons 26 is of no moment. Assembly is preferably facilitated by using a simple form of barrel gear instead of the shaft 39 and its two pinions.

Obviously, therefore, numerous structural departures might be made from the illustrated embodiment of the invention within the spirit and scope of the appended claims.

We claim:

1. A windshield wiping mechanism including a pair of parallel spaced wiper carrying rack bars, a driving gear disposed between and meshing with the rack bars to simultaneously slide them in opposite directions, and means to guide the sliding movement of the rack bars.

2. A windshield wiping mechanism including a pair of parallel spaced toothed wiper carrying slides, a driving gear disposed between and meshing with the teeth of the slides to simultaneously slide them in opposite directions, and means for imparting an intermittent alternating rotary movement to the gear to reciprocate the slides.

3. A windshield wiper mechanism including a cylinder, a pair of pistons reciprocating in the cylinder and a rigd rack bar connecting the pistons, a pair of spaced parallel wiper carrying rack bars disposed exteriorly, a gear between said last mentioned rack bars meshing with both of them to simultaneously slide them in opposite directions and means for imparting an alternating rotary motion to the gear from the piston rod rack bar.

4. A windshield wiper mechanism including a cylinder, a pair of pistons reciprocating in the cylinder and a rigid rack bar connecting the pistons, a pair of spaced parallel wiper carrying rack bars disposed exteriorly, a gear between said last mentioned rack bars meshing with both of them to simultaneously slide them in opposite directions and means for imparting an alternating rotary motion to the gear from the piston rod rack bar, including a gear meshing with the piston rod rack bar and a transverse supporting shaft journaled in the cylinder to which both of said gears are fixed.

5. A windshield wiper mechanism including a cylinder, a pair of pistons reciprocating in the cylinder and a rigid rack bar connecting the pistons, a pair of spaced parallel wiper carrying rack bars disposed exteriorly, a gear between said last mentioned rack bars meshing with both of them to simultaneously slide them in opposite directions and means for imparting an alternating rotary motion to the gear from the piston rod rack bar, hollow guide tubes disposed exteriorly of the cylinder and guiding the sliding movement of the wiper carrying rack bars.

6. A windshield wiper mechanism including a cylinder, a pair of pistons reciprocating in the cylinder and a rigid rack bar connecting the pistons, a pair of spaced parallel wiper carrying rack bars disposed exteriorly, a gear between said last mentioned rack bars meshing with both of them to simultaneously slide them in opposite directions and means for imparting an alternating rotary motion to the gear from the piston rod rack bar, hollow guide tubes disposed exteriorly of the cylinder and guiding the sliding movement of the wiper carrying rack bars, said guides and rack bars having cooperating ribs and grooves to prevent movement of the rack bars in any direction other than an axial one.

7. A windshield wiper including a pair of parallel wiper members, a pair of toothed slides carrying said members and means always in mesh with both of said slides to reciprocate the slides.

8. A windshield wiper including a motor casing a pair of parallel guides arranged exteriorly thereof, wiper carrying slides travelling in the guides, means disposed exteriorly of the motor casing and alternately rotated in opposite directions by the motor, permanently in mesh with the slides to impart an oppositely reciprocating simultaneous movement thereto.

9. A windshield wiping mechanism including a pair of sliding carrier members, said carrier members being arranged in spaced parallel relationship and including rack means at their adjacent faces, wipers carried by said members and arranged to work upon the same face of a windshield, a gear disposed between and constantly in mesh with the rack faces of both of said carrier members and motor means for imparting an alternating rotary motion to the gear to effect simultaneous reciprocation of the wipers in relatively opposite directions.

Signed at New York, in the county of New York and State of New York, this 10th day of July, 1928.

DAVID KUSKIN.
CHARLES KUSKIN.